United States Patent
Blin et al.

(10) Patent No.: US 9,965,975 B2
(45) Date of Patent: May 8, 2018

(54) PUZZLE SYSTEM OF ELEMENTS FOR PAIRING

(71) Applicants: Christine Cheng Blin, Virum (DK); Allan Blin Cheng, Virum (DK)

(72) Inventors: Christine Cheng Blin, Virum (DK); Allan Blin Cheng, Virum (DK)

( * ) Notice: Subject to any disclaimer, the term of this patent is extended or adjusted under 35 U.S.C. 154(b) by 245 days.

(21) Appl. No.: 15/091,766

(22) Filed: Apr. 6, 2016

(65) Prior Publication Data
US 2017/0294142 A1 Oct. 12, 2017

(51) Int. Cl.
*G09B 1/00* (2006.01)
*G09B 23/02* (2006.01)
*G09B 1/16* (2006.01)

(52) U.S. Cl.
CPC .............. *G09B 23/02* (2013.01); *G09B 1/16* (2013.01)

(58) Field of Classification Search
USPC ....... 434/156, 157, 168, 171, 172, 188, 190, 434/191, 193, 205, 208
See application file for complete search history.

(56) References Cited

U.S. PATENT DOCUMENTS

| | | | | |
|---|---|---|---|---|
| 2,481,058 A | * | 9/1949 | Zarlengo | B44B 3/061 273/157 R |
| D163,085 S | * | 5/1951 | Bishop | 434/205 |
| 3,224,114 A | * | 12/1965 | Swanson | A63F 3/0415 273/157 R |
| 3,302,310 A | * | 2/1967 | Leven | G09B 17/00 273/156 |
| 3,357,116 A | * | 12/1967 | Bazacos | G09B 19/02 434/193 |
| 3,469,325 A | * | 9/1969 | Malvin | G09B 3/08 273/156 |
| 3,773,327 A | * | 11/1973 | Kremer | A63F 9/20 273/294 |
| 3,787,599 A | * | 1/1974 | Castanis | G09B 19/02 434/205 |
| 4,044,476 A | * | 8/1977 | Marsh | A63F 9/0001 273/157 R |
| 4,212,118 A | * | 7/1980 | Baldwin | G09B 19/025 434/208 |
| 4,776,802 A | * | 10/1988 | Rind | A63F 3/0423 273/157 R |
| 5,040,987 A | * | 8/1991 | Frazier | G09B 1/06 434/188 |

(Continued)

*Primary Examiner* — Kurt Fernstrom
(74) *Attorney, Agent, or Firm* — Mollborn Patents, Inc.; Fredrik Mollborn

(57) ABSTRACT

A system includes several pairable elements and elements to be used for such a system. Each of the elements is adapted to be combined with another element, thereby constituting a pair of elements. The elements include a first indicator where when combining the first indicator of a first element and the first indicator of a second element in a manner specific to the first indicators, the combined first indicators indicate if the first and second elements are a pair. Further, elements include a second indicator where when combining the second indicator of the first element and a second indicator of the second element in an manner specific to the second indicators, the combined second indicators indicate if the elements are a pair and if they are not a pair, the combined second indicators identify the right element to pair with said first and second element.

16 Claims, 3 Drawing Sheets

(56) References Cited

U.S. PATENT DOCUMENTS

| | | | | |
|---|---|---|---|---|
| 5,447,433 A * | 9/1995 | Perry, Jr. | ............ | G09B 1/06 |
| | | | | 434/171 |
| 5,529,497 A * | 6/1996 | Bigold | ............ | G09B 1/02 |
| | | | | 434/191 |
| 5,545,042 A * | 8/1996 | Barrows | ............ | G09B 1/16 |
| | | | | 434/191 |
| 5,553,856 A * | 9/1996 | Barnard | ............ | A63F 9/0098 |
| | | | | 273/156 |
| 5,568,924 A * | 10/1996 | Katsuren | ............ | A63F 1/02 |
| | | | | 273/292 |
| 5,868,393 A * | 2/1999 | Williams | ............ | A63F 1/00 |
| | | | | 273/299 |
| 6,062,864 A * | 5/2000 | Rood | ............ | G09B 19/02 |
| | | | | 434/129 |
| 6,619,661 B1 * | 9/2003 | Collins | ............ | A63F 9/10 |
| | | | | 273/157 R |

* cited by examiner

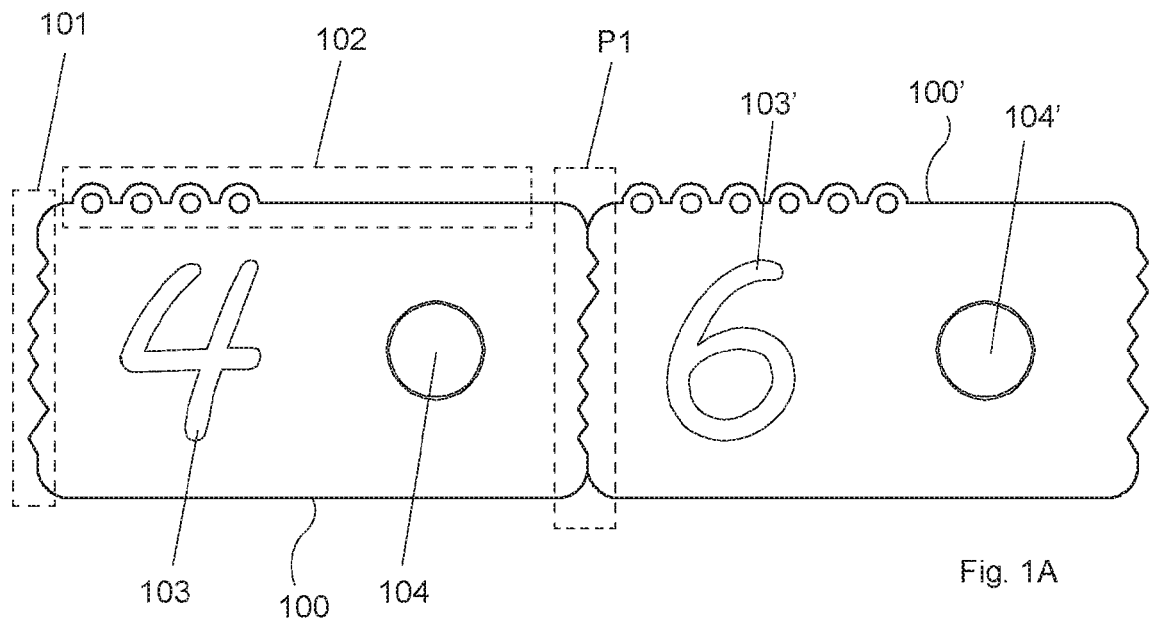
Fig. 1A
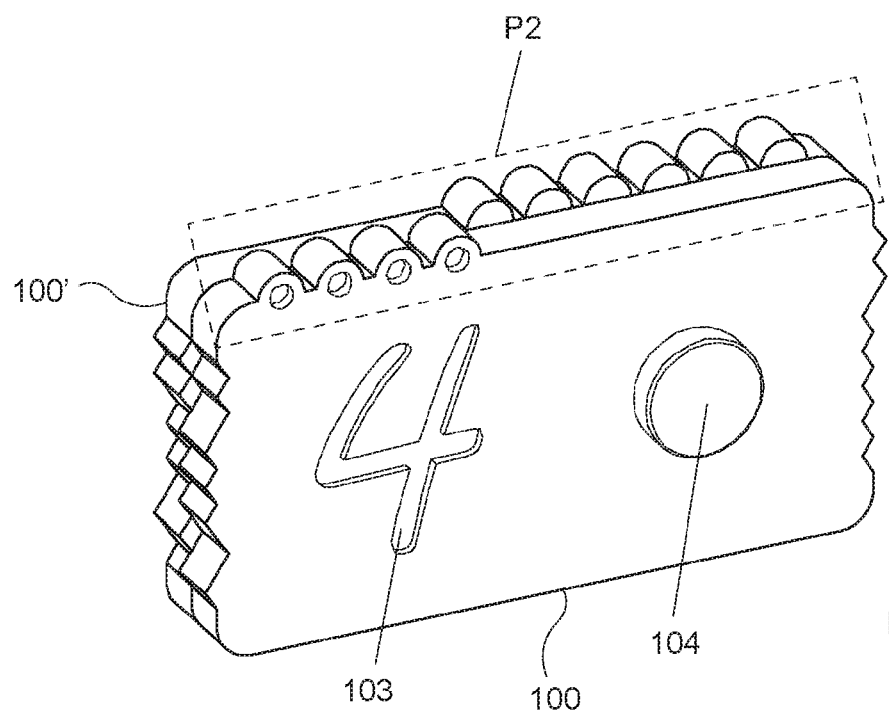
Fig. 1B
Fig. 1

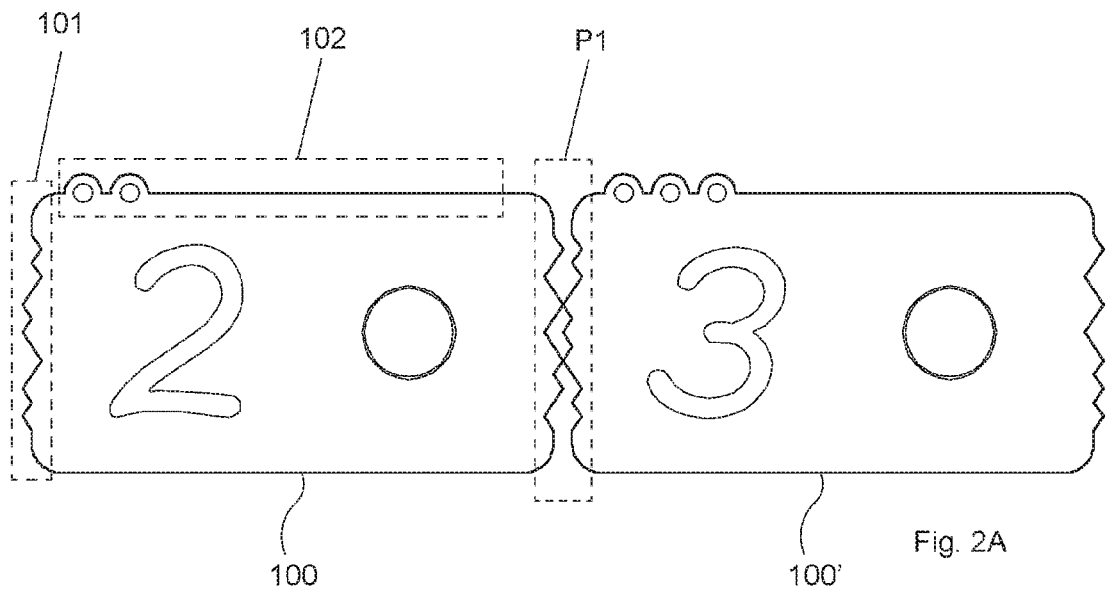
Fig. 2A
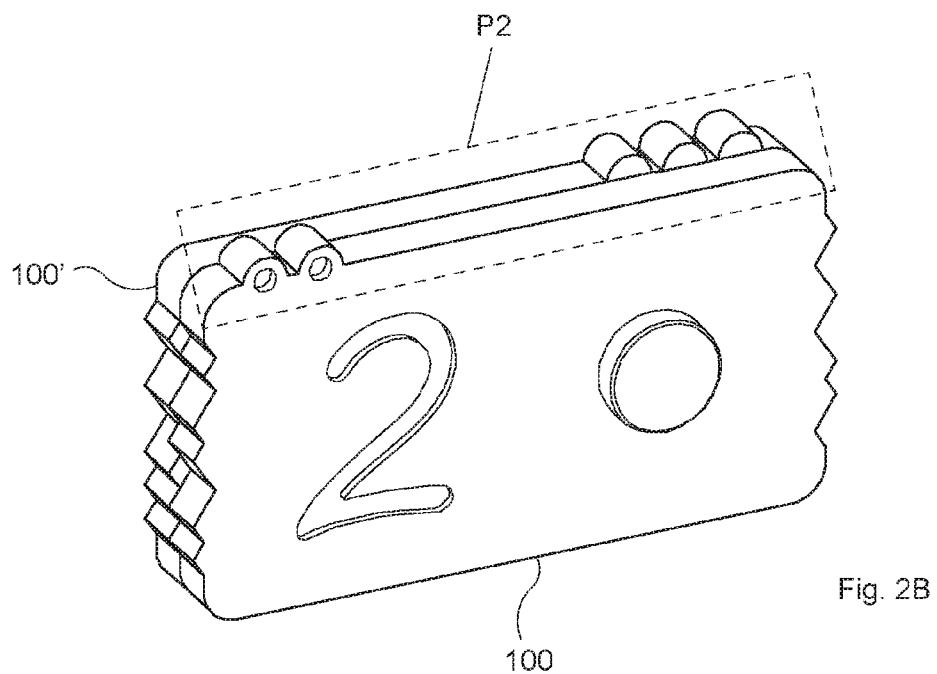
Fig. 2B
Fig. 2

PUZZLE SYSTEM OF ELEMENTS FOR PAIRING

BACKGROUND

The present invention relates to a system comprising a plurality of pairable elements and elements to be used for such a system.

Children need to learn various topics to enter into education and jobs during later stages of their life as well as for successful functioning in various aspects of their life. Mathematics is a topic which frustrates children consistently due to its abstract nature and which is also useful later on.

Many attempts have been made to convey the substance of math and numbers to children at various ages to help them grasp the topic faster and better. Some of these attempts have been designed with a playful pedagogic principle in mind, where the child needs to grasp elements relating to mathematics to succeed in the task. In later years, a tendency has developed where learning moves into the digital sphere to realize the potentials of computers. However, this reduction to digital media comes at the cost of tactile sensations and often encourages working or playing alone.

Examples are the many math applications found on Apple's iTunes or Google's Play app store. Children have to interact with a device screen, such as an iPad, and often end up sitting on their own as the user interface does not easily promote several simultaneous participants. If there is something the child does not understand, there is no social anchor to maintain the discipline of the child and no support to help with questions, and the child may become frustrated.

SUMMARY

In accordance with one aspect of the invention, there is provided a system comprising a plurality of elements, wherein each of the elements is adapted to be combined with another of said elements thereby constituting a pair of elements. The elements comprise a first indicator where when combining the first indicator of a first element and the first indicator of a second element in a manner specific to the first indicators, the combined first indicators indicate if the first and second elements are a pair.

Further elements comprise a second indicator, where when combining the second indicator of the first element and a second indicator of the second element in an manner specific to the second indicators, the combined second indicators indicate if the elements are a pair and if they are not a pair, the combined second indicators identify the right element to pair with said first and second element.

By this double pairing indication, a differentiated evaluation is achieved, where a mismatch between elements is not only identified, but the correct solution is identified if there is a mismatch. In other words, this allows fast feedback allowing quick iterations that enhance performance by allowing precise identification of remediation.

In an embodiment of the invention, the first indicator is a jigsaw-shaped surface, and said combined first indicators are obtained by comparing the jigsaw-shaped surface on a first and a second element. By comparing is meant aligning the elements next to each other, whereby the jigsaw surfaces of the elements are brought into contact with each other, and whereby these jigsaw-shaped surfaces then define substantially mutual negative space thus allowing for a close fit where both surfaces touch each other more or less completely. It is not important for the invention that these jigsaw shapes lock into each other in the plane, but may conveniently simply be mutually key-shaped or saw-shaped. In an embodiment of the invention, the jigsaw shape may comprise substantially rectangular shapes and/or curved shapes.

In an embodiment of the invention, the second indicator is protrusions and said combined second indicators are obtained by comparing the protrusions on a first and a second element.

In an embodiment of the invention, the elements are a planar, rectangular element having opposite first sides and opposite second sides, and wherein said first sides are provided with said first indicators, and said second sides are provided with said second indicators.

In an embodiment of the invention, the elements are provided with a third indicator indicating if a first and a second element are possible pairs.

In an embodiment of the invention, the third indicator is a color, and elements having the same color(s) are possible pairs.

In an embodiment, the elements further comprise fixing means on a first side and a cavity on the back side corresponding to a location and size of said fixing means, whereby elements may be stacked fixedly by stacking said elements and inserting the fixing means of an element into cavities of another element.

In accordance with another aspect, the invention relates to an element to be used in a system according to the above, wherein the element is adapted to be combined with another of said elements.

DESCRIPTION OF THE DRAWINGS

The various embodiments of the invention are explained in detail below with reference to the drawings, in which:

FIG. 1A illustrates two matching elements paired by a first pairing method in accordance with one embodiment, FIG. 1B illustrates two matching elements paired by the second pairing method in accordance with one embodiment, FIG. 2A illustrates two non-matching elements paired by the first pairing method in accordance with one embodiment, FIG. 2B illustrates two non-matching elements paired by the second pairing method in accordance with one embodiment.

DETAILED DESCRIPTION OF DRAWINGS

Figure 3:
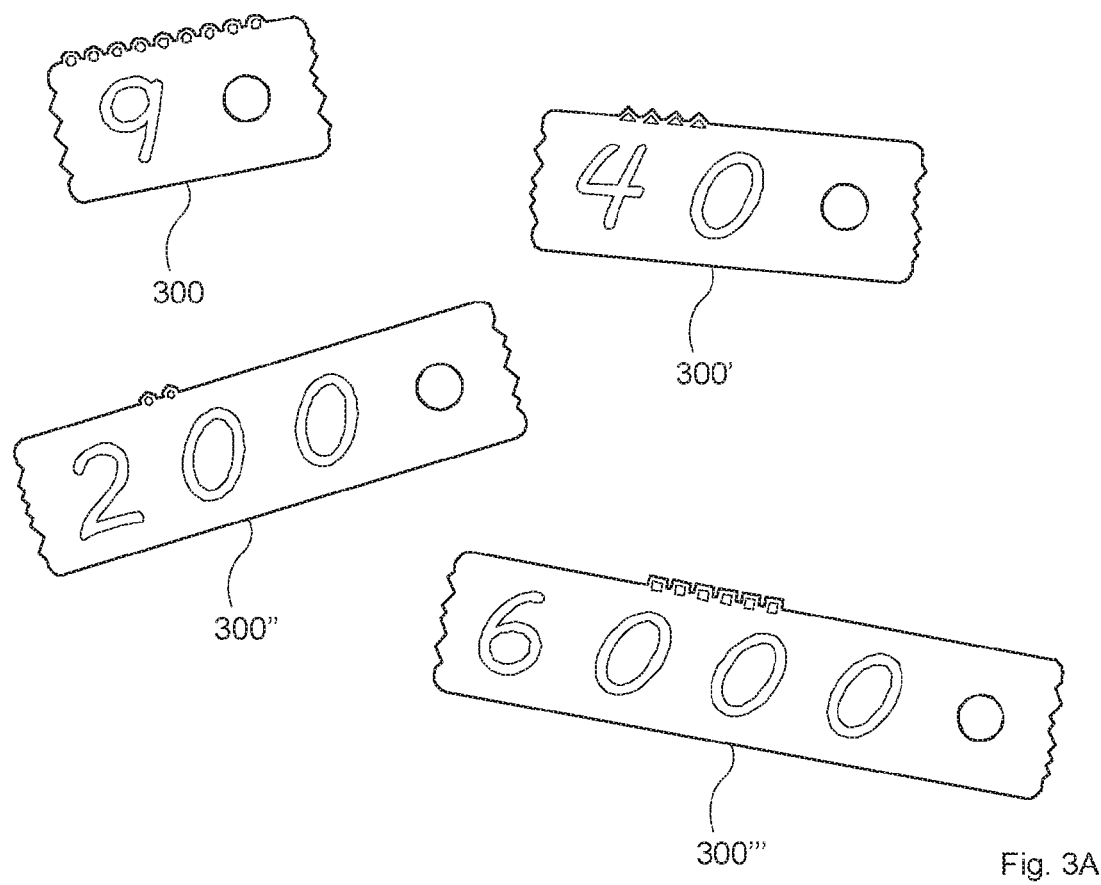
FIG. 3A illustrates further elements of the system in accordance with one embodiment.
FIG. 3B illustrates an aspect of the system where the elements may be stacked in accordance with one embodiment.
Figure 3:
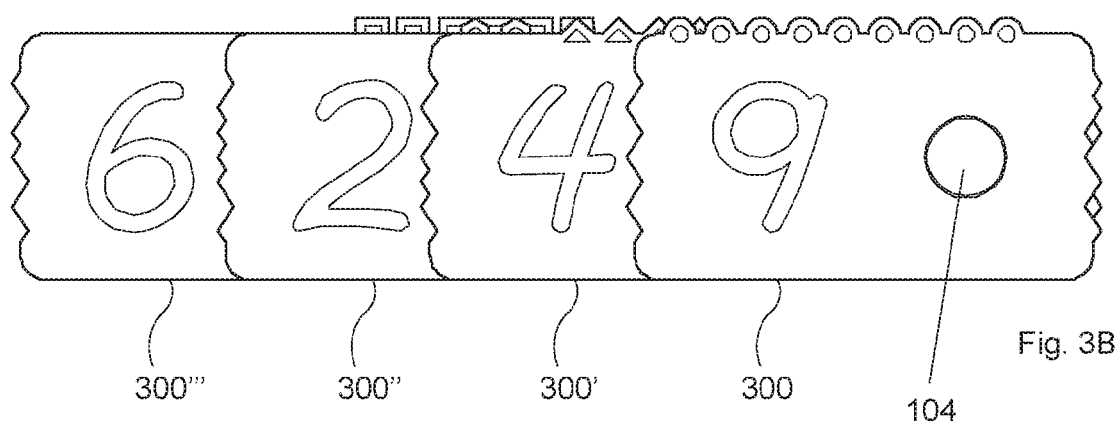

In the following, the invention will be described by way of example through a series of embodiments.

FIG. 1 illustrates pairing of elements 100, 100' of the system according to the invention, in accordance with one embodiment. In this embodiment of the invention, it relates to a puzzle of rectangular blocks, each with first pairing indicator 101 and second pairing indicator 102. Generally, these pairing indicators are adapted to enable assessment of a relationship between two elements 100, 100'. In the illustrated embodiment, the relationship of interest is that the sum of element integers 103, 103' expressed on the rectangular blocks equals ten. In other embodiments of the invention, the relationship to be assessed may be a different relationship, such as any other number, for example 2, 6, 8, 12, 20 or 24.

FIG. 1A illustrates two matching elements paired by a first pairing method P1. In the embodiment illustrated, the first pairing indicator 101 is implemented as a jigsaw mechanism, where only pairs designated to match have matching surfaces, such as an element 100 having the number four and a second element 100' having the number six.

FIG. 1B illustrates two matching elements paired by the second pairing method P2, in accordance with one embodiment. In the embodiment illustrated, the second pairing method is shaped as a numeral indicator, where each element has a number of protrusions equal to its element number 103. Aligning an element 100 and a second element 100' back-to-back allows assessing whether the protrusions take up the whole of a predefined space without overlap. If this is the case, the second pairing is successful. In the embodiment shown, this is implemented by the protrusions taking up substantially a tenth of the upper side of the rectangular block. The alignment may be performed in any other convenient way, such as one element being rotated 180 degrees, whereby the protrusions of each element thus point towards the other element. This is convenient for example if it is desired to keep the elements on a table. In an embodiment of the invention, the second pairing method comprises a first step of evaluating whether the two elements are a pair as described immediately above, and then, if they are not, a discrepancy between their sum and ten is assessed, such as if it sums to twelve, an overlap of two protrusions exists and this is noted. In another embodiment, the invention further comprises a step of comparing each of the two elements with other elements to find ones that are then, in the given example, two smaller than each of the elements. This may be performed by fixing elements together to identify how much larger or smaller they are than each other. By this method, finding the correct elements to pair becomes possible through tactile sensations.

These comparisons are easy and intuitive to perform even for those unskilled in mathematics and numbers generally since they can be touched and seen, and success is easily achieved through trial and error by simply putting down one of the chosen elements and selecting another. Thus, the system becomes an effective teaching tool for showing and instructing in a subject matter that is otherwise abstract and must be learnt by tedious repetition while allowing for cooperation and assistance close to the learning process.

FIG. 2 illustrates unsuccessful pairing. FIG. 2A illustrates two non-matching elements paired by the first pairing method P1. FIG. 2B illustrates two non-matching elements paired by the second pairing method P2.

By comparing elements by the first pairing method P1, the match or mismatch of elements may be determined. Further, if the first pairing method P1 proves that the elements do not match, the second pairing method may be used to assess the nature of the mismatch. When aligning for the second pairing method P2, a gap between the protrusions of the elements signifies not only that they do not match, but further that the elements sum to less than ten, and if protrusions overlap, they sum to more than ten.

This allows feedback more nuanced and helpful than a Boolean yes/no, which allows the system to support more nuanced training. If participants feel comfortable guessing at a new element without using the second pairing method P2, they may do so. In other words, by having both a first pairing method P1 and a second pairing method P2, which afford different levels of feedback, the system allows participants to evolve their understanding and confidence of the subject, such as mathematics.

FIG. 3 illustrates another aspect of the system in accordance with one embodiment, where integers are included, which are larger than one-digit numbers by powers of ten, such as tens, hundreds and thousands.

FIG. 3A illustrates an assortment of elements of different powers of ten. Included in the illustration is a first element 300 with a single digit, a second element 300' with two digits, a third element 300" with three digits and a fourth element 300''' with four digits.

The second pairing indicator 102 is determined only by the significant front digit of these numbers, so that for example the fourth element 300''' having the element number 6,000 has six protrusions, while the second element 300' having the number 40 has four protrusions, and so on.

A third pairing indication may be used to help differentiate between elements relating to the number of digits, which they comprise. Such a third pairing indication may be color. For example, single-digit elements may be yellow, double-digit elements may be green, three-digit elements may be blue and four-digit elements may be red. Further, the second pairing indicator 102 may advantageously be of a different shape for each power of ten included in the system. This allows differentiation between elements which may otherwise seem to match, such as the second element 300' having an element number of 40, thus having four protrusions, and the fourth element 300''' having an element number of 6,000 having six protrusions. In the illustrated embodiment, fourth element 300''' has rectangular protrusions, while second element 300' has triangular protrusions.

FIG. 3B illustrates an aspect of the system, where elements of different powers of ten may be stacked using a fixing means 104. Each element has a cavity on the backside corresponding to a location and size of the fixing means 104 allowing elements to be stacked fixedly by inserting the fixing means 104 of elements into cavities of elements put onto these. This allows stacking numbers controllably. In an embodiment of the invention, the size of elements depends on the number of digits on them, so that the large numbers are represented by large elements. In an embodiment of the invention, this aspect of the invention allows stacking elements by using the fixing means 104 to create specific four-digit numbers, such as 6,249 as seen in FIG. 3B.

By using relatively large numbers in this way, participants may grow comfortable with even great numbers which it may otherwise take a long time for them to comprehend. For a while when learning specifically mathematics, children have a desire to explore the farther reaches of their capabilities which often expresses itself as wanting to count to the largest numbers which they can think of. This may be seen as an expression of testing whether the rules of mathematics that govern the numbers they know also govern the larger numbers. Learning that even large numbers work in exactly the same way, as small numbers is a lesson in itself that is taught by the system according to the invention.

A series of different exercises may be performed with this system of elements. Four of these will be described in detail in the following; 'how much larger', 'ten friends', 'building houses' and 'boil the numbers'.

In how much larger, two or more elements of the same power of ten are fixed using the fixing means 104, whereby they are aligned in a way that leaves the second indicators 102 being aligned for comparison. This should not be confused with the second pairing method P2 since in how much larger, the orientation of the elements is different, and comparison between the second indicator is convenient, not the assessment against ten. However, in an embodiment of the invention, P2 comprises how much larger as a step. If, for example an element with a number four and an element with a number six are fixed, they will both have the first four protrusions. Further, the element with six protrusions will have two that the element with four protrusions does not have, where these does not overlap. Thereby, the participant knows that six is greater than four by two.

In the exercise ten friends, two elements are compared to assess if they sum to ten, and whether or not these elements are ten friends is assessed. This can be performed with the afore-mentioned first and second pairing methods P1, P2.

In the exercise building houses, the participant is educated in the decimal system by fixing elements of increasing powers of ten. Advantageously, the numbers above ten and twenty are added slowly as the participant grows comfortable with the larger numbers. For example, an instructor may ask the participant to build a '24' house, whereupon it is the task of the participant to find '20' and '4' and then fix them.

In the exercise boiling the numbers, seemingly large numbers are summed using the system cooperatively. Children often react with disbelief that this should be possible. A couple of participants, such as three, each builds a two-digit number. For example, the three participants may build '19', '27' and '36'. Then, these numbers are disassembled and all put into a container. Taking turns, the participants take out two elements of the same power of ten (for example identified by color) and sum them. Whatever they sum to is put back into the container instead of the numbers taken out. For example a '7' and a '6' sum to '13' that the participant then builds and puts into the container. This is continued until no two elements remain of the same power of ten. The participants then take out the elements and build them into the number, which they becomes. This sparks the curiosity and confidence of the children.

REFERENCE NUMERALS

100—element
100'—second element
101—first pairing indicator
102—second pairing indicator
103—element number
103'—second element number
104—fixing means
104'—second fixing means
P1—first pairing method
P2—second pairing method
300—element
300'—second element
300"—third element
300'''—fourth element

The invention claimed is:

1. A system comprising a plurality of elements, wherein each of said elements is adapted to be combined with another of said elements thereby constituting a pair of elements, each of said elements comprising a first indicator and a second indicator, said indicators being shaped in a manner whereby:
   when combining said first indicator of a first element and a first indicator of a second element in a first indicator specific manner, the combined first indicators indicate if the first and second elements are a pair; and further
   when combining the second indicator of said first element and a second indicator of a second element in an second indicator specific manner, the combined second indicators indicate if the elements are a pair and if they are not a pair, the combined second indicators identify the right element to pair with said first and second element.

2. A system according to claim 1, wherein said first indicators are a jigsaw-shaped surface, and said combined first indicators are obtained by comparing the jigsaw-shaped surfaces on a first and a second element.

3. A system according to claim 1, wherein said second indicators are protrusions, and said combined second indicators are obtained by comparing the protrusions on a first and a second element.

4. A system according to claim 3, wherein said elements belong to different categories, and wherein the shape of said protrusions identifies said category.

5. A system according to claim 1, wherein said elements are a planar, rectangular elements having opposite first sides and opposite second sides, and wherein said first sides are provided with said first indicators, and said second sides are provided with said second indicators.

6. A system according to claim 1, wherein said elements are provided with a third indicator indicating if a first and a second element are possible pairs.

7. A system according to claim 6, wherein said third indicator is a color, and wherein elements having the same colors are possible pairs.

8. A system according to claim 1, wherein said elements further comprise fixing means on a first side and a cavity on the back side corresponding to a location and size of said fixing means, whereby elements may be stacked fixedly by stacking said elements and inserting the fixing means of an element into cavities of another element.

9. An element to be used in a system comprising a plurality of said elements, wherein said element is adapted to be combined with another of said elements, whereby said combined elements constitute a pair of elements, said element comprising a first indicator and a second indicator, said indicators being shaped in a manner whereby:
   when combining said first indicator of said element and a first indicator of a second element in an first indicator specific manner, the combined first indicators indicate if said element and said second element are a pair; and further
   when combining the second indicator of said element and a second indicator of said second element in an second indicator specific manner, the combined second indicators indicate if the elements are a pair and if they are not a pair, the combined second indicators identify the right element to pair with said first and second element.

10. An element according to claim 9, wherein said first indicator is a jigsaw-shaped surface.

11. An element according to claim 10, wherein said second indicator is a protrusion.

12. An element according to claim 11, wherein the shape of said protrusion identifies the category of said element.

13. An element according to claim 9, wherein said element is planar having opposite first sides and opposite second sides, and wherein said first sides are provided with said first indicators, and said second sides are provided with said second indicators.

14. An element according to claim 9, wherein said element is provided with a third indicator indicating if it is pairable with said second elements.

15. An element according to claim 14, wherein said third indicator is a color, and wherein elements having the same colors are possible pairs.

16. An element according to claim 9, wherein said element further comprises fixing means on a first side and a cavity on the back side corresponding to a location and size of said fixing means, whereby said elements may be stacked fixedly by stacking said elements and inserting the fixing means of an element into cavities of another element.

\* \* \* \* \*